(12) United States Patent
Ellis et al.

(10) Patent No.: US 11,346,012 B2
(45) Date of Patent: May 31, 2022

(54) ELECTROCHEMICAL CELL COMPRISING ELECTRICALLY CONDUCTIVE DIAMOND ELECTRODES

(71) Applicant: ELEMENT SIX TECHNOLOGIES LIMITED, Didcot (GB)

(72) Inventors: Julian James Sargood Ellis, Didcot (GB); Timothy Peter Mollart, Didcot (GB); John Robert Brandon, Didcot (GB)

(73) Assignee: Element Six Technologies Ltd, Didcot (GB)

( * ) Notice: Subject to any disclaimer, the term of this patent is extended or adjusted under 35 U.S.C. 154(b) by 258 days.

(21) Appl. No.: 16/063,637

(22) PCT Filed: Nov. 25, 2016

(86) PCT No.: PCT/EP2016/078782
§ 371 (c)(1),
(2) Date: Jun. 18, 2018

(87) PCT Pub. No.: WO2017/108327
PCT Pub. Date: Jun. 29, 2017

(65) Prior Publication Data
US 2018/0371629 A1 Dec. 27, 2018

(30) Foreign Application Priority Data
Dec. 21, 2015 (GB) .................................. 1522500

(51) Int. Cl.
*C25B 1/04* (2021.01)
*C25B 11/036* (2021.01)
(Continued)

(52) U.S. Cl.
CPC .......... *C25B 11/036* (2021.01); *C02F 1/4672* (2013.01); *C02F 1/46104* (2013.01);
(Continued)

(58) Field of Classification Search
CPC ........... C25B 9/063; C25B 9/18; C25B 15/08; C25B 9/06; C25B 9/203; C25B 1/04
(Continued)

(56) References Cited

U.S. PATENT DOCUMENTS

2014/0054166 A1* 2/2014 Brandon ............. C02F 1/46104
204/275.1

FOREIGN PATENT DOCUMENTS

EP    0659691 B1    5/1998
EP    2772469 A1    2/2013
(Continued)

OTHER PUBLICATIONS

Haenni, Werner, et al., "Chapter 5: Industrial Applications of Diamond Electrodes," Semiconductors and Semimetals, Jan. 1, 2004, pp. 149-196, Elsevier.
(Continued)

*Primary Examiner* — Zulmariam Mendez
(74) *Attorney, Agent, or Firm* — Kilpatrick Townsend & Stockton LLP

(57) ABSTRACT

An electrochemical cell for treating a fluid, the electrochemical cell comprising: at least two opposing electrodes defining a flow path for the fluid between the electrodes, where at least one of the electrodes is formed of electrically conductive diamond material; drive circuitry configured to apply a potential across the electrodes such that a current flows between the electrodes when the fluid is flowed through the flow path between the electrodes; and a housing in which the electrodes are disposed, the housing comprising pressure seals configured to containing the fluid within the fluid path and a support structure for supporting the electrodes, wherein the support structure and the pressure seals are configured such that the electrochemical cell has an operating pressure in a range 2 to 10 bar within which the (Continued)

electrodes are supported without fracturing and within which the fluid is contained within the flow path, wherein the electrodes are spaced apart by a distance in a range 0.5 mm to 4 mm, and wherein the drive circuitry is configured to apply a potential across the electrodes giving a current density $\geq 15{,}000$ Amp/m$^2$ over an electrode area of at least 20 cm$^2$ for an operating voltage of no more than 20 V.

14 Claims, 6 Drawing Sheets

(51) Int. Cl.
*C02F 1/467* (2006.01)
*C02F 1/461* (2006.01)
*C25B 11/057* (2021.01)

(52) U.S. Cl.
CPC ........ *C02F 1/46109* (2013.01); *C25B 11/057* (2021.01); *C02F 2001/46128* (2013.01); *C02F 2001/46147* (2013.01); *C02F 2201/004* (2013.01); *C02F 2201/4611* (2013.01)

(58) Field of Classification Search
USPC .......................................... 204/248
See application file for complete search history.

(56) References Cited

FOREIGN PATENT DOCUMENTS

| | | |
|---|---|---|
| GB | 2490913 A | 11/2012 |
| WO | 2008029258 A2 | 3/2008 |
| WO | 2008056336 A1 | 5/2008 |
| WO | 2012049512 A2 | 4/2012 |
| WO | 2014090663 A1 | 6/2014 |

OTHER PUBLICATIONS

International Patent Application No. PCT/EP2016/078782, International Search Report and Written Opinion dated Jan. 16, 2017, 11 pages.
United Kingdom Patent Application No. GB1522500.6, Combined Search and Examination Report dated Jun. 20, 2016, 5 pages.
United Kingdom Patent Application No. GB1619940.8, Combined Search and Examination Report dated Apr. 25, 2017, 6 pages.

* cited by examiner

ELECTROCHEMICAL CELL COMPRISING ELECTRICALLY CONDUCTIVE DIAMOND ELECTRODES

FIELD OF INVENTION

The present invention relates to an electrochemical cell comprising a plurality of electrically conductive diamond electrodes.

BACKGROUND OF INVENTION

The use of an electrochemical cell for treating waste water to break down dissolved pollutants via oxidation and render contaminants less harmful is known in the art. Selecting electrodes which have a sufficiently high oxidation potential and applying high potentials to such electrodes in contact with waste water it is possible to generate highly reactive radicals, such as hydroxyl radicals, and these create an aggressive oxidising environment in which dissolved pollutants are broken down.

It is also known in the art that electrically conductive diamond electrodes can be used in such waste water treatment applications. For example, EP0659691 describes such a use for electrically conductive diamond electrodes. Electrically conductive diamond material is believed to have a number of advantageous features in these applications including high hardness, high thermal conductivity, chemical inertness, and wide potential window. These features are considered to give electrically conductive diamond material the best combination of properties for electrochemical generation of highly reactive radicals for waste water purification while not damaging the electrodes thus allowing for prolonged use.

One possible configuration for an electrochemical cell comprising diamond electrodes is a bipolar cell configuration. Such a configuration comprises a stack of bipolar electrodes provided between a single anode electrical connection and a single cathode electrical connection. In such a bipolar configuration, a plurality of electrodes are disposed between the end anode and cathode such that when a large electric field is applied between the end anode and end cathode each intermediate electrode will have one side functioning as an anode and an opposite side functioning as a cathode (i.e. each intermediate electrode will be bipolar). Such an arrangement ensures that both sides of each electrically conductive diamond electrode are active which can be important given that the rate of electrochemical reaction is dependent on the active surface area of the electrodes. Furthermore, such a bipolar electrode configuration does not require electrical connections to be made to the intermediate bipolar electrodes which can be problematic for electrodes made of electrically conductive diamond material when compared with conventional metal electrodes.

WO2008/029258 describes that solid, free-standing diamond electrodes have better lifetime in such applications but that achieving the required electrically conductivity in such thick, free-standing diamond electrodes can be difficult. As such, WO2008/029258 described a method of achieving high boron doping concentrations in thick, free-standing diamond electrodes to achieve suitably high electrical conductivity and describes the use of such electrodes in a bipolar electrochemical cell configuration. Both parallel flow and serpentine flow configurations are suggested for use in a bipolar configuration with a parallel flow configuration being indicated as preferable.

In relation to the above, FIG. 1 illustrates a bipolar electrochemical cell with a parallel flow configuration according to WO2008/029258 whereas FIG. 2 illustrates a bipolar electrochemical cell with a serpentine flow configuration according to WO2008/029258. Both these configurations comprise a bipolar stack of electrically conductive diamond electrodes including an end anode 2, an end cathode 4, and a plurality of intermediate bipolar electrodes 6 disposed between the anode 2 and cathode 4. The anode 2 and cathode 4 each comprise a single electrical connection 8, 10 coupled to a switching DC power supply 11. The configuration illustrated in FIG. 1 comprises a plurality of parallel fluid paths 12 disposed between the plurality of electrically conductive diamond electrodes. In contrast, the configuration illustrated in FIG. 2 comprises a serpentine flow path 13 passing between the plurality of electrically conductive diamond electrodes.

WO2012/049512 identifies a number of further problems with bipolar electrochemical cell configurations such as the one described in WO2008/029258 associated primarily with the fact that the diamond electrodes are supported only at the ends of the electrodes. These problems include the following: (1) thin, free standing (i.e. no support substrate) diamond electrodes are prone to mechanical failure; (2) thick diamond electrodes are expensive to manufacture; (3) the practical lower limit of electrode spacing to ensure that no electrical shorting occurs is higher than optimal for electrochemical performance; and (4) insufficient turbulence in the cell reduces mass transport rate at electrode surfaces. WO2012/049512 proposes that all these problems can be at least partially solved by providing a porous support structure (e.g. made of a corrosion resistant plastic) between the diamond electrodes in a bipolar cell configuration. Such a support structure allows relatively thin diamond electrodes to be utilized without mechanical failure. Furthermore, such a support structure allows the electrode spacing to be narrowed without risk of electrical shorting. Further still, the support structure can function to increase turbulence and mass transport rate at electrode surfaces.

In light of the above, WO2012/049512 represents the state of the art to date with respect to electrochemical cell configurations comprising free-standing, electrically conductive diamond electrodes. Such a bipolar electrochemical cell configuration is illustrated in FIG. 3 with FIG. 4 showing an example of a porous support structure which can be disposed in the fluid paths between the diamond electrodes of the electrochemical cell of FIG. 3. The configuration illustrated in FIG. 3 is similar to that illustrated in FIG. 1 and comprises a bipolar stack of electrically conductive diamond electrodes including an end anode 2, an end cathode 4, and a plurality of intermediate bipolar electrodes 6 disposed between the anode 2 and cathode 4. The anode 2 and cathode 4 each comprise a single electrical connection 8, 10 coupled to a switching DC power supply 11. As in FIG. 1, the configuration illustrated in FIG. 3 comprises a plurality of parallel fluid paths 12 disposed between the plurality of electrically conductive diamond electrodes. The difference between the configuration illustrated in FIG. 1 and the configuration illustrated in FIG. 3 is that the configuration illustrated in FIG. 3 comprises a porous support structure 14 which is disposed in the fluid paths between the diamond electrodes of the electrochemical cell. An example of such a porous support structure 14 is illustrated in FIG. 4 and comprises a network of corrosion resistant plastic members 16 forming a porous wafer which can be sandwiched between adjacent electrically conductive diamond electrodes to support the electrodes while allowing fluid to flow between the adjacent electrically conductive diamond electrodes as indicated by the arrows in FIG. 4.

A configuration according to that illustrated in FIGS. 3 and 4 includes a number of advantageous features including the following:
(1) Provision of multiple bipolar solid diamond electrodes and use of both surfaces of each bipolar electrode increasing active electrode surface area.
(2) Switching polarity thus mitigating fouling.
(3) Dry electrical connections.
(4) Simple two electrical feed-through.
(5) Low electrode spacing increasing efficiency.
(6) Physical robustness.
(7) Increased inter-electrode turbulence via suitable support structure design.
(8) Easily scalable to n cells via one pair of end electrodes and applying >2×n Volts.

However, some problems can still be identified in terms of realizing a commercially viable electrochemical cell configuration comprising free-standing, electrically conductive diamond electrodes for waste water treatment. Perhaps the most important of these is that a bipolar cell configuration requires the use of a high operating voltage to achieve the desired current densities which can be costly from an operating perspective.

WO2014/090663 discloses several alternatives to a bipolar cell configuration for diamond-based electrochemical cells. However, such alternative configurations can be more complex to implement and still require a relatively high operating voltage, thus meaning that cost of operation is still a critical issue for commercial applications.

It is an aim of embodiments of the present invention to at least partially solve the aforementioned problem in diamond-based electrochemical cells.

SUMMARY OF INVENTION

According to one aspect of the present invention there is provided an electrochemical cell for treating a fluid, the electrochemical cell comprising:
at least two opposing electrodes defining a flow path for the fluid between the electrodes, where at least one of the electrodes is formed of electrically conductive diamond material;
drive circuitry configured to apply a potential across the electrodes such that a current flows between the electrodes when the fluid is flowed through the flow path between the electrodes; and
a housing in which the electrodes are disposed, the housing comprising pressure seals configured to containing the fluid within the fluid path and a support structure for supporting the electrodes,
wherein the support structure and the pressure seals are configured such that the electrochemical cell has an operating pressure in a range 2 to 10 bar within which the electrodes are supported without fracturing and within which the fluid is contained within the the flow path,
wherein the electrodes are spaced apart by a distance in a range 0.5 mm to 4 mm, and
wherein the drive circuitry is configured to apply a potential across the electrodes giving a current density ≥15,000 Amp/m$^2$ over an electrode area of at least 20 cm$^2$ for an operating voltage of no more than 20 V.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION OF CERTAIN EMBODIMENTS

An embodiment of the present invention is based on a modified version of the proprietor's own earlier diamond-based bipolar electrochemical cell configuration as described in WO2012/049512. The configuration described in WO2012/049512 comprises a support structure, electrode spacing (5 mm), and seals configured to provide an operating pressure of approximately 1 bar and a current density of 5,000 Amp/m$^2$ over an electrode area of at least 20 cm$^2$ for an operating voltage of 8 V or a current density of 10,000 Amp/m$^2$ over an electrode area of at least 20 cm$^2$ for an operating voltage of 12 V. In practice, it has been found that it would be advantageous to increase the current density for a given applied potential while retaining a large electrode area. While larger current densities have been achieved for diamond-based electrochemical cell configurations with smaller electrodes, it is the combination of a high current density and a large electrode area which results in a more efficient electrochemical processing cell.

Figure 1:
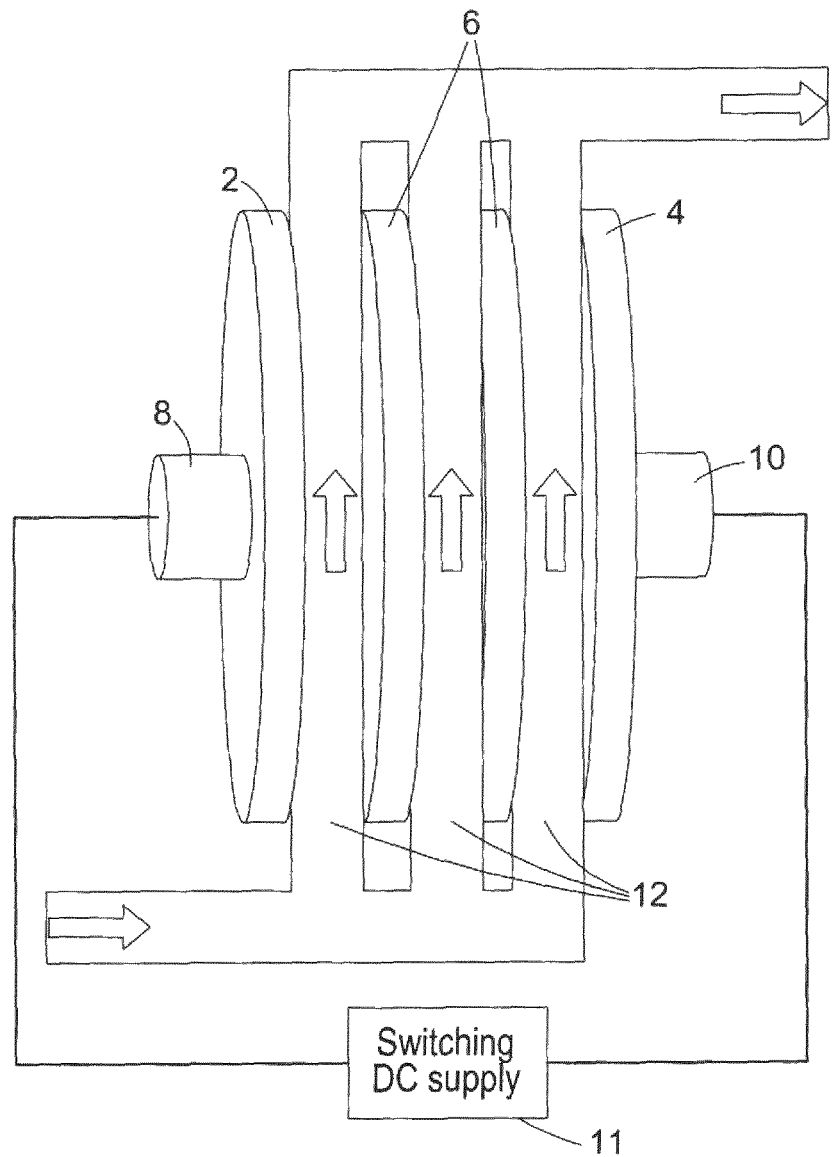
FIG. 1 shows a bipolar electrochemical cell with a parallel flow configuration according to WO2008/029258.
Figure 2:
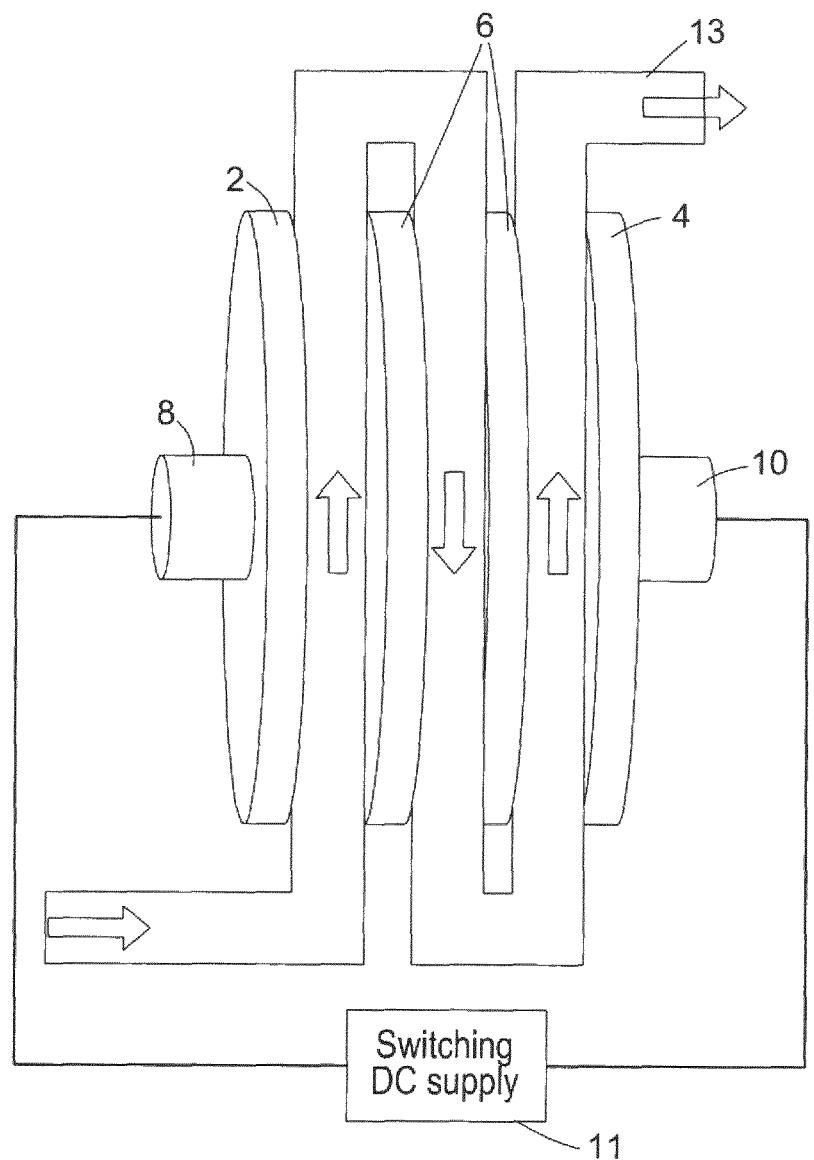
FIG. 2 illustrates a bipolar electrochemical cell with a serpentine flow configuration according to WO2008/029258.
Figure 3:
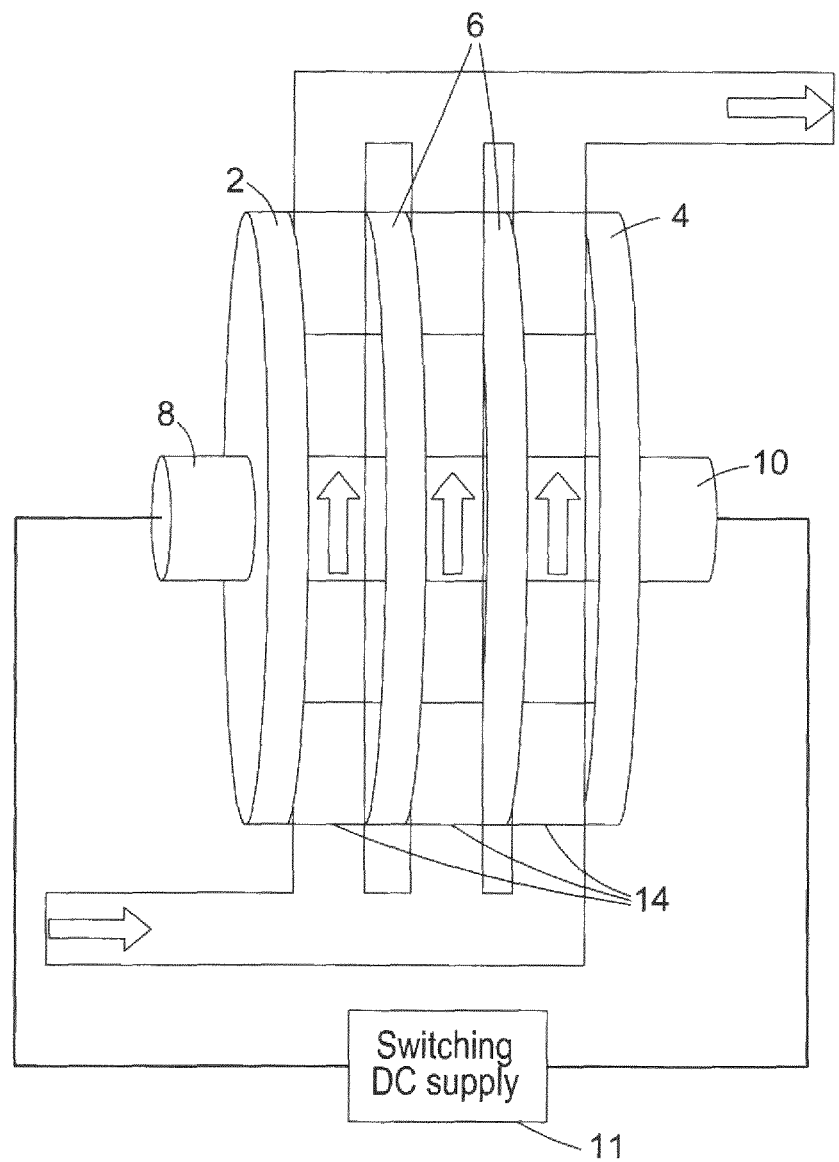
FIG. 3 illustrates a bipolar electrochemical cell with a parallel flow configuration and a plurality of support structures disposed between the electrodes according to WO2012/049512.
Figure 4:
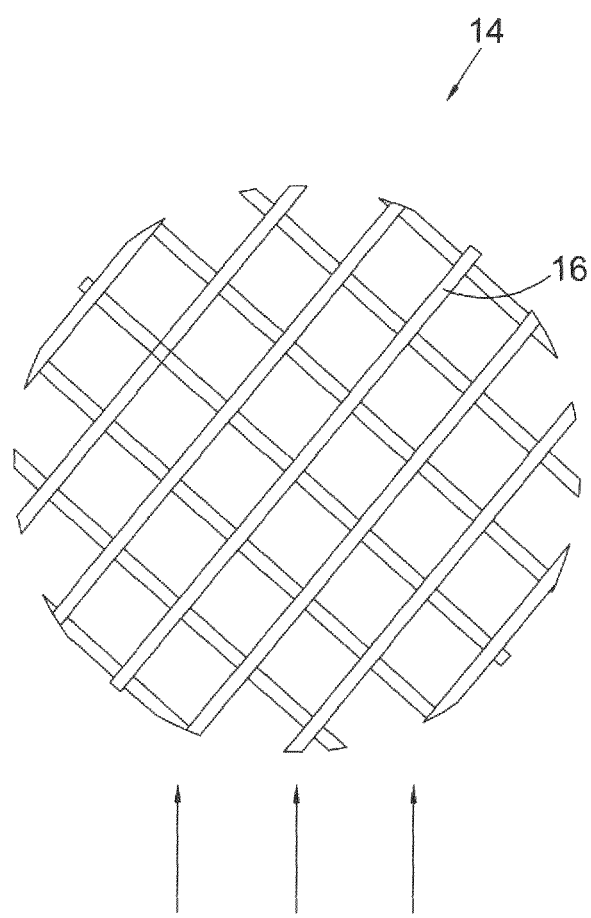
FIG. 4 illustrates an example of a support structure according to WO2012/049512.
Figure 5:
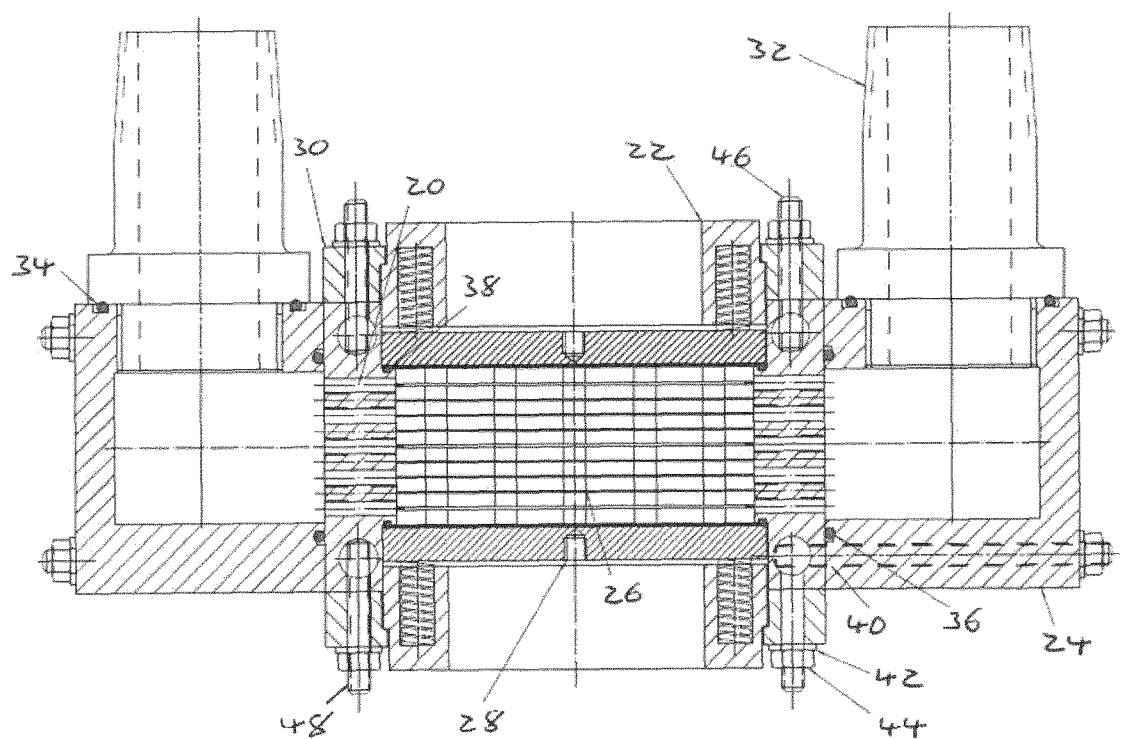
FIG. 5 illustrates an example of an electrochemical cell according to WO2012049512.

FIG. 5 illustrates an example of an electrochemical cell according to WO2012049512. The configuration comprises the following components: main body assembly 20; spring loaded clamp 22; manifold 24; cassette assembly 26; end electrode 28; outer clamp ring 30; adapter 32; o-rings 34, 36, 38; studding 40; washer 42; nut 44; and studs 46, 48.

Figure 6:
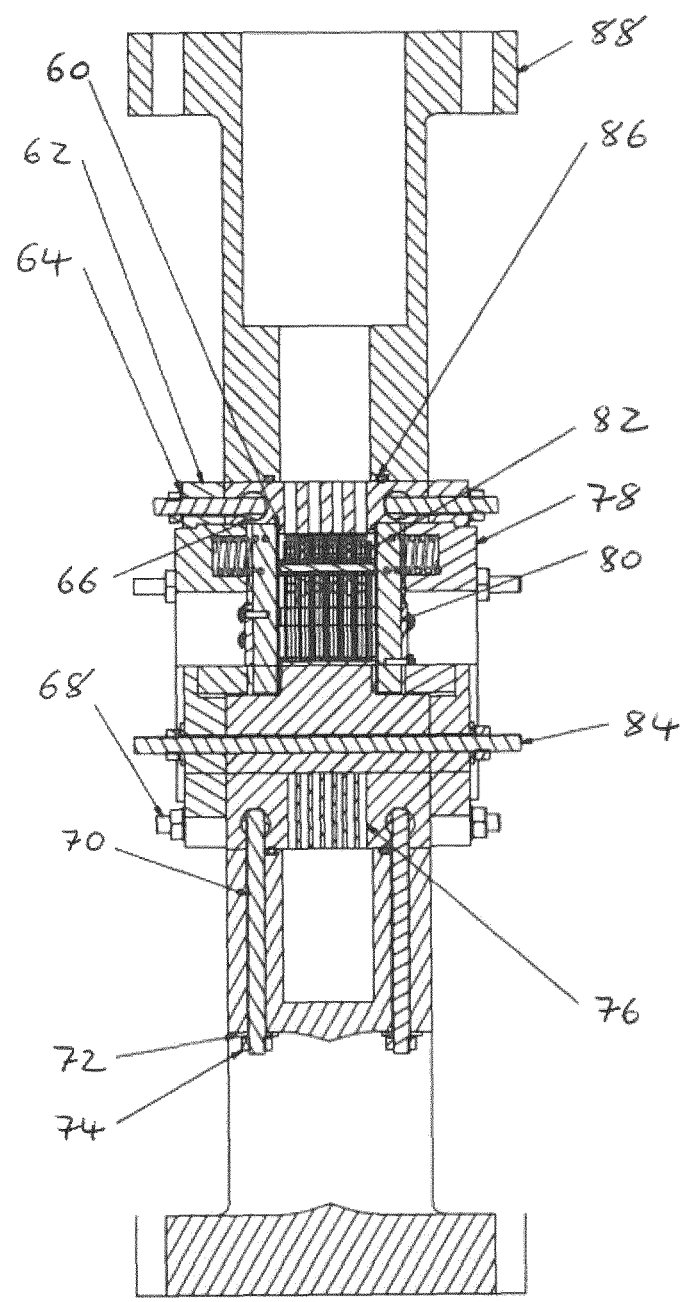
FIG. 6 illustrates a modified electrochemical cell according to an embodiment of the present invention.

FIG. 6 illustrates a modified electrochemical cell according to an embodiment of the present invention. The configuration comprises the following components: o-ring 60; outer clamp ring 62; disk spring 64; trunnion 66; threaded studs 68, 70; washer 72; nut 74; main body 76; spring clamp 78; electrode assembly 80; cassette assembly 82; threaded stud 84; o-ring 86; and manifold 88.

The present inventors have reduced the electrical resistivity of the diamond-based electrochemical cell in two major ways: (i) reducing the diamond electrode spacing; and (ii) redesigning the housing including the diamond electrode support structure and the pressure seals to increase the operating pressure and flow velocity. In this regard, reducing the electrode spacing reduces the distance through which current is required to pass through the fluid between the electrodes thus reducing electrical resistance. Increasing the operating pressure reduces the size of gas bubbles in the fluid thus reducing the resistivity of the fluid. Furthermore, fluid flow velocity can be increased without exceeding operating pressure limits of such a modified electrochemical cell. Increasing fluid flow velocity aids in removal of bubbles from the surface of the diamond electrodes which again leads to a reduction in the resistivity of the fluid between the diamond electrodes.

At the same time, desired operating conditions must be balanced against tolerances of the components of the cell. For example, operating at too high a pressure can lead to fracture of the diamond electrodes, especially relatively thin, large area diamond electrodes. While the electrode area can be reduced to increase robustness to cracking, a reduction in electrode area reduces the oxidative capacity of the cell. As such, a balance must be struck between increased operating pressure, retention of large area electrodes, and robustness to leakage and cracking. Furthermore, reducing electrode spacing results in a reduced size of flow path for the fluid, which can cause problems of clogging of the flow path with solid particulates in the fluid. Furthermore, reducing the size of the flow path between the electrodes increases fluid flow velocity for a given flow rate. While an increase in flow velocity is advantageous for the aforementioned reason of bubble removal, if the increased flow velocity results in too much of a pressure increase then this can lead to leakage or electrode fracture. As such, the present inventors have defined upper and lower limits for operating pressure and electrode spacing and redesigned the electrode support structure and pressure seals to achieve the desired electrode spacing and operating pressure while retaining a robust configuration.

In light of the above, an electrochemical cell configuration is provided which comprises:

at least two opposing electrodes defining a flow path for the fluid between the electrodes, where at least one of the electrodes is formed of electrically conductive diamond material;

drive circuitry configured to apply a potential across the electrodes such that a current flows between the electrodes when the fluid is flowed through the flow path between the electrodes; and a housing in which the electrodes are disposed, the housing comprising pressure seals configured to containing the fluid within the fluid path and a support structure for supporting the electrodes, wherein the support structure and the pressure seals are configured such that the electrochemical cell has an operating pressure in a range 2 to 10 bar within which the electrodes are supported without fracturing and within which the fluid is contained within the the flow path, wherein the electrodes are spaced apart by a distance in a range 0.5 mm to 4 mm, and wherein the drive circuitry is configured to apply a potential across the electrodes giving a current density $\geq 15{,}000$ Amp/m$^2$ over an electrode area of at least 20 cm$^2$ for an operating voltage of no more than 20 V.

The electrodes may include two end electrodes and one or more intermediate electrodes disposed between the end electrodes forming a bipolar cell configuration. However, it should be noted that the electrochemical cell configuration is not limited to a bipolar cell configuration and the teachings of this specification can also be applied to alternative configurations as described, for example, in WO2014/090663.

The support structure and the pressure seals may be configured such that the operating pressure of the electrochemical cell is at least 3 or 4 bar and optionally no more than 8 or 5 Bar. The lower limit to the pressure configuration is defined by the desire to increase pressure and thus reduce the size of bubbles and thus the resistivity of the fluid. The upper limit to the pressure configuration is defined by the pressure at which leakage and/or electrode fracture occurs. This is dependent on the strength of the diamond electrodes, the support structure for the electrodes, and the pressure rating of the pressure seals. The pressure seals may be selected to fail at a pressure which is below that where the electrodes fracture. Furthermore, a leakage detection system may be provided to shut down the cell on detection of a leak. Such a combination of features limits cell damage if, for example, solid particulates block the flow path leading to an increase in pressure which could damage the cell.

The electrode spacing may be no more than 3.5 mm, 3.0 mm, 2.5 mm, or 2 mm and optionally no less than 0.75 mm, 1 mm, 1.25 mm, or 1.5 mm. The upper limit for the electrode spacing is set by the desire to reduce the distance between the electrodes thus reducing the resistance of the cell and also providing an increased fluid flow velocity and pressure for a given volume flow rate which reduces the size and number of bubbles thus reducing the sensitivity of the fluid between the electrodes. The lower limit for the electrode spacing is set by the desire to avoid blockages caused by solid particulates and to ensure that the flow velocity and pressure is not so high that leakage or electrode fracture becomes problematic.

The electrode area may be at least 40 cm$^2$, 60 cm$^2$, 80 cm$^2$, 100 cm$^2$, or 120 cm$^2$ and optionally no more than 200 cm$^2$, 150 cm$^2$, or 130 cm$^2$. The electrode area is the surface area of one side of an electrode exposed to the fluid. The lower limit is set by the desire to have a large electrode area which increases oxidative capacity. The upper limit is set by the cost of the electrodes and the difficulty in supporting larger area diamond electrodes while operating at high pressures without the electrodes fracturing.

The drive circuitry can be configured to apply a current density $\geq 20{,}000$ Amp/m$^2$, $\geq 25{,}000$ Amp/m$^2$, $\geq 28{,}000$ Amp/m$^2$, or $\geq 29{,}000$ Amp/m$^2$ over the electrode area and optionally a current density no more than 40,000 Amp/m$^2$, 35,000 Amp/m$^2$, or 32,000 Amp/m$^2$ over the electrode area. These current densities are achieved for an operating voltage of no more than 20 V. It is desired to provide an extremely high current density in order to provide a high oxidative capacity. It is further desired that this should be provided at a relatively low voltage as available power may be limited at point of use and higher powers will result in large operating costs. The upper limit will be set by the desire to keep power requirements and cost down.

The electrochemical cell may be provided with a pump system for pumping fluid through the cell with a flow velocity of at least 1 ms$^{-1}$, 1.3 ms$^{-1}$, 1.6 ms$^{-1}$, or 2 ms$^{-1}$ and optionally no more than 10 ms$^{-1}$, 5 ms$^{-1}$, or 3 ms$^{-1}$. As previously described, increased flow velocity can remove bubbles from the electrode surfaces and increase pressure thus reducing bubble size. Both of these effects result in a reduced resistivity and thus an increased current density for a given applied voltage. However, if the flow velocity is too high then the pressure may increase to such an extent that leakage of diamond electrode fracture is problematic.

As compared to the previous cell configuration as illustrated in FIG. 5, the modified cell configuration as illustrated in FIG. 6 now has a linear configuration with a flanged inlet and outlet. The electrode clamping force has been increased and the material of the O-ring seals changed taking into account chemical resistance, loading, and thermal effects. Finite Element Analysis (FEA) has been utilized to optimize seal loading and materials selection based on loading/thermal effects. In this regard, it should be noted that electrochemical cells designed to operate at higher current densities and water pressures increase the demand on the components used to seal and package the diamond electrodes. Polymer components exposed to the electrolyte are advantageously fluoropolymers or related materials to resist the increased chemical corrosion found in the local vicinity of electrolysis. Increasing the operating pressure requires the compressive force used for the sealing to be increased and the use of coned-disk washers on all fasteners to apply a pre-loading force is advantageous. The support interface between the diamond electrode and the backing clamp must be sufficiently stiff so as to prevent tensile stresses from fracturing the diamond electrodes while a compressive clamping force is applied to the sealing surface.

The modified bipolar cell configuration comprises 21 boron doped diamond electrodes having a 1.6 mm spacing. Each electrode has a diameter of 130 mm and a thickness of 0.6 mm. The cell is configured to operate at a pressure of around 3 bar, a flow rate of around 25,000 litres/hour, a flow velocity >1.0 m sec$^{-1}$, and a current density of 28,000 Am$^{-2}$ or more. Power requirements are 120 to 250 kW and the Maximum Oxidation Capacity is approximately 2 kg h$^{-1}$ compared with a previous value of 0.5 kg h$^{-1}$.

While the embodiment described above is in a bipolar configuration, it is envisaged that the present invention can be applied to other electrochemical cell configurations. Furthermore, it may be noted that in operation the anode electrodes function to generate oxidizing species. As such, in one configuration the plurality of electrodes comprise a plurality of opposing pairs of electrodes, each opposing pair of electrodes comprising one electrode which is formed of a solid sheet of electrically conductive diamond material and another electrode which is formed of non-diamond material such as a metal or metal composite material. However, in preferred configurations the plurality of electrodes comprise a plurality of opposing pairs of electrodes where both electrodes in each opposing pair of electrodes are formed of a solid sheet of electrically conductive diamond material.

In addition to water treatment applications as described herein, embodiments of the present invention can also be used to generate bleach (OCl$^-$) via the electrolysis of brine solutions.

While this invention has been particularly shown and described with reference to embodiments, it will be understood to those skilled in the art that various changes in form and detail may be made without departing from the scope of the invention which is defined by the appending claims.

The invention claimed is:

1. An electrochemical cell for treating a fluid, the electrochemical cell comprising:
   at least two opposing electrodes defining a flow path for the fluid between the electrodes, where at least one of the electrodes is formed of electrically conductive diamond material;
   drive circuitry configured to apply a potential across the electrodes such that a current flows between the electrodes when the fluid is flowed through the flow path between the electrodes; and
   a housing in which the electrodes are disposed, the housing comprising pressure seals configured to containing the fluid within the flow path and a support structure for supporting the electrodes, the support structure being disposed in the flow path between the opposing electrodes,
   wherein the support structure and the pressure seals are configured such that the electrochemical cell has an operating pressure in a range 3 to 10 bar within which the electrodes are supported without fracturing and within which the fluid is contained within the flow path,
   wherein the electrodes are spaced apart by a distance in a range 0.5 mm to 3.5 mm, and
   wherein the drive circuitry is configured to apply a potential across the electrodes giving a current density ≥15,000 Amp/m$^2$ over an electrode area of at least 20 cm$^2$ for an operating voltage of no more than 20 V.

2. An electrochemical cell according to claim 1, wherein the electrodes include two end electrodes and one or more intermediate electrodes disposed between the end electrodes forming a bipolar cell configuration.

3. An electrochemical cell according to claim 1, wherein the support structure and the pressure seals are configured such that the operating pressure of the electrochemical cell is at least 4 bar.

4. An electrochemical cell according to claim 1, wherein the pressure seals are configured such that the operating pressure of the electrochemical cell is no more than 8 bar.

5. An electrochemical cell according to claim 1, wherein the pressure seals are configured such that the operating pressure of the electrochemical cell is no more than 5 bar.

6. An electrochemical cell according to claim 1, wherein the electrode spacing is no more than 3.0 mm, 2.5 mm, or 2 mm.

7. An electrochemical cell according to claim 1, wherein the electrode spacing is no less than 0.75 mm, 1 mm, 1.25 mm, or 1.5 mm.

8. An electrochemical cell according to claim 1, wherein the electrode area is at least 40 cm$^2$, 60 cm$^2$, 80 cm$^2$, 100 cm$^2$, or 120 cm$^2$.

9. An electrochemical cell according to claim 1, wherein the electrode area is no more than 200 cm$^2$, 150 cm$^2$, or 130 cm$^2$.

10. An electrochemical cell according to claim 1, wherein the drive circuitry is configured to apply a current density ≥20,000 Amp/m$^2$, ≥25,000 Amp/m$^2$, ≥28,000 Amp/m$^2$, or ≥29,000 Amp/m$^2$ over the electrode area.

11. An electrochemical cell according to claim 1, wherein the drive circuitry is configured to apply a current density no more than 40,000 Amp/m$^2$, 35,000 Amp/m$^2$, or 32,000 Amp/m$^2$ over the electrode area.

12. An electrochemical cell according to claim 1, further comprising a pump system for pumping fluid through the cell with a flow velocity of at least 1 ms$^{-1}$, 1.3 ms$^{-1}$, 1.6 ms$^{-1}$, or 2 ms$^{-1}$.

13. An electrochemical cell according to claim 12, wherein the pump system is configured such that the flow velocity is no more than 10 ms$^{-1}$, 5 ms$^{-1}$, or 3 ms$^{-1}$.

14. An electrochemical cell according to claim 12, wherein the electrochemical cell has an operating pressure in a range 3 to 8 bar within which the electrodes are supported without fracturing.

* * * * *